J. J. SMITH.
Feed Rack.
No. 66,180.  Patented June 25, 1867.
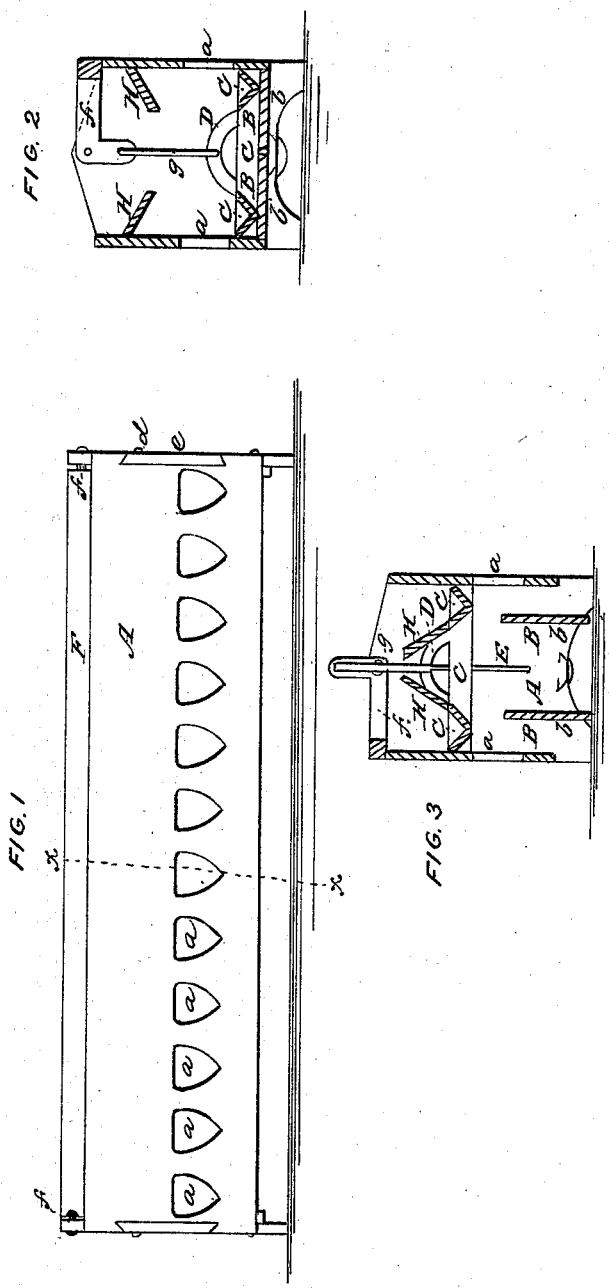

United States Patent Office.

JOEL J. SMITH, OF BARNESVILLE, OHIO.

Letters Patent No. 66,180, dated June 25, 1867.

---

SHEEP-FEEDING RACK.

---

The Schedule referred to in these Letters Patent and making part of the same.

---

TO ALL WHOM IT MAY CONCERN:

Be it known that I, JOEL J. SMITH, of Barnesville, Belmont county, Ohio, have invented a new and useful improvement in Sheep-Feeding Rack; and I do hereby declare that the following is a full, clear, and exact description thereof, which will enable others skilled in the art to make and use the same, reference being had to the accompanying drawings, forming part of this specification.

This invention relates to a sheep-rack and feeding-trough combined in such a way as to facilitate the feeding and economize the feed, and consists of a rectangular box, perforated to admit the sheep's head. The bottom consists of a pair of doors turning on pivots, for convenience in clearing out the rack. The troughs are inside the rack, and, when feeding, rest upon the bottom, but when not in use are elevated out of the way by a simple lever arrangement, by which they are carried into a position just over the perforations in the rack and beneath two pivoted shields, which serve to protect the troughs and the seed therein, and also to prevent the latter from being spilled when being placed in the troughs. In the accompanying drawings—

Figure 1 is a front elevation of my improved sheep-feeding rack.

Figure 2 is a section thereof at line $x\ x$; and

Figure 3 is a like section, showing the troughs elevated and the shield open for insertion of the feed.

Similar letters of reference indicate corresponding parts.

A A is the perforated rack, having the perforations $a\ a$ for the sheep to insert their heads; B B are two bottom pieces or doors pivoted at $b$, to enable the doors to be opened and the rack cleared out; C C are troughs connected by the end pieces $c\ c$, on which is the semicircular piece or segment D, held in place to the end of the rack A by the pin $d$, working in the slots $e$. A bar, F, attached at each end to the bell-cranks $f^1$ operates them, and the rods $g\ g$ raising and lowering the troughs C as desired. The shields H, hung on pivots and bevelled to rest snugly against the rack, lap over the troughs C when the latter are raised, serving to protect them and the seed therein. To replenish the troughs the latter are raised beneath the shields H, the shields turned on their pivots, as shown in fig. 3, and the seed dropped in the troughs; the shields are then closed to the rack, and the troughs lowered when desired.

Having thus described my invention, what I claim as new, and desire to secure by Letters Patent, is—

1. The pivoted bottom B B, in combination with a sheep-rack, in manner substantially and as and for the purposes described.

2. The combination of the rack and adjustable troughs, in manner substantially as herein shown and described.

3. The troughs C, adjustable by the bell-cranks and lever arrangements, in manner and operating substantially as above set forth and described.

4. The pivoted shields H, in combination with troughs C, in manner and operating substantially as and for the purposes described.

The above specification of my invention signed by me this 27th day of fourth month, 1867.

JOEL J. SMITH.

Witnesses:
THOMAS S. FRASIER,
HEZEKIAH BAILEY.